US006961687B1

(12) United States Patent
Myers, Jr. et al.

(10) Patent No.: US 6,961,687 B1
(45) Date of Patent: Nov. 1, 2005

(54) INTERNET BASED PRODUCT DATA MANAGEMENT (PDM) SYSTEM

(75) Inventors: Kenneth N. Myers, Jr., Manassas, VA (US); Jennie D. Beckley, Herndon, VA (US); Debra Ann Mroczek, Warrenton, VA (US); Quynh Anh Nguyen, Herndon, VA (US); Galen P. Plunkett, Manassas, VA (US); Dinesh Verma, Centreville, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 843 days.

(21) Appl. No.: 09/631,694

(22) Filed: Aug. 3, 2000

Related U.S. Application Data

(60) Provisional application No. 60/146,996, filed on Aug. 3, 1999.

(51) Int. Cl.$^7$ .............................................. G06G 7/48
(52) U.S. Cl. .................. 703/6; 709/205; 709/228; 700/96; 700/97; 700/117; 700/180; 715/727; 715/733; 715/734; 715/741; 715/744; 715/751; 715/753
(58) Field of Search ............................. 703/22; 707/9, 707/10

(56) References Cited

U.S. PATENT DOCUMENTS

| | | | | |
|---|---|---|---|---|
| 4,875,162 A | * | 10/1989 | Ferriter et al. ................. 705/29 |
| 5,233,513 A | * | 8/1993 | Doyle ............................. 705/7 |
| 5,493,679 A | * | 2/1996 | Virgil et al. ............. 707/104.1 |
| 5,671,360 A | * | 9/1997 | Hambrick et al. ............. 705/9 |
| 5,740,425 A | * | 4/1998 | Povilus ....................... 707/100 |
| 6,049,803 A | * | 4/2000 | Szalwinski .................. 707/100 |
| 6,075,539 A | * | 6/2000 | Ishida et al. ................ 345/419 |
| 6,115,690 A | * | 9/2000 | Wong ............................. 705/7 |
| 6,138,121 A | * | 10/2000 | Costa et al. ................. 707/100 |
| 6,175,838 B1 | * | 1/2001 | Papierniak et al. ......... 707/203 |
| 6,466,935 B1 | * | 10/2002 | Stuart ........................... 707/10 |
| 6,499,001 B1 | * | 12/2002 | Meyer ......................... 702/187 |
| 6,501,501 B1 | * | 12/2002 | Miyazawa .................. 348/143 |
| 2002/0188927 A1 | * | 12/2002 | Bellagamba ................ 717/101 |
| 2003/0050859 A1 | * | 3/2003 | Rodriguez et al. ............ 705/27 |

OTHER PUBLICATIONS

Myers, Kenneth N. and Verma Dinesh. "System Design to Affordability in a Collaborative Systems Engineering Environment," Proceedings of INCOSE, (1999) (p. 1-10).*

(Continued)

*Primary Examiner*—Kevin J. Teska
*Assistant Examiner*—Thomas Stevens
(74) *Attorney, Agent, or Firm*—Whitham, Curtis & Christofferson, P.C.

(57) ABSTRACT

An integrated product data environment for system design and optimization, e.g., a Collaborative Engineering Environment (CEE). The CEE provides a multi-disciplinary engineering team with immediate access to all relevant product information. It is an enterprise system at the program as well as the company levels, managing product information as a program and corporate asset. Product-centric collaborative capabilities for the CEE are provided by extending the functionality of a commercial Product Data Management (PDM) System. Emerging web-centric commercial-off-tho-shelf (COTS) PDM capabilities, object-oriented technologies, associated rapid application development environments, sophisticated engineering toolsets, and COTS computing and communications technologies have been leveraged to establish the CEE for the complex electronic systems integration domain. The CEE offers substantial improvements in productivity, cost savings, cycle time reductions, product integrity and lifetime support of a system.

21 Claims, 7 Drawing Sheets

OTHER PUBLICATIONS

Myers, Kenneth N. and Beckley, Jennie. "A Web-Centric Collaborative Engineering Environment for Product Centered Lifetime Support." Proceedings of the INCOSE Mid-Atlantic Regional Conference, (2000) (p. 1-9).*

PCT WO 0167279 A2 "Integrated Business System for the Design, Execution, and Management of Products" (Sep. 13, 2001) (p. 1-30).*

Myers, Kenneth N. and Mimi Nguyen. "Exploiting the Collaborative Engineering Environment as a Critical Resource Multiplier" (1998) (p. 1-9).*

Stanley-R. A Methodology for Evaluating and Optimizing Wireless System Infrastructure Costs. (1996) IEEE (p. 1044-1048).*

System Design and Operational Effectiveness. School of Engineering. Dr. Dimesh Verma Program Director. http://ww.soe.stevens-tech.edu/sdoe/People/faculty_verma.html (p. 1-5) 2004.*

McQuay-W., "Air-Force Modeling and Simulation Trends—Modeling and Simulation Makes Possible the Unaffordable" Sep.-Oct. 1997 http://www.msiac.dmso.mil/sba_documents/AF%20M&S%20Trends%20-%20mcquay.pdf.*

McQuay-W.K. "A Collaborative Engineering Environment for 21st Century Avionics" IEEE Aerospace Conference 1998. p. 225-262.*

Hara-H et al. "Model-based Architecture for the Internet" Inspec. Compsac'97 Washington D.C. Aug. 1997. p. 182-187.*

\* cited by examiner

INTERNET BASED PRODUCT DATA MANAGEMENT (PDM) SYSTEM

CROSS-REFERENCE TO RELATED APPLICATION

This application claims priority to Provisional Patent Application Ser. No. 60/146,996 entitled "Integrated Design/Data Environment: System Life Cycle Costing and Enhanced Readiness through an Optimized Support Infrastructure" filed by D. Verma, G. Plunkett, K. Myers and J. Beckley on Aug. 3, 1999, the entire subject matter of which is incorporated herein by reference. This application is related to U.S. application Ser. No. 09/577,039, entitled "Multi-disciplinary Information Engine for Total Ownership Cost Estimation of Complex Systems," filed on May 24, 2000 by K. Myers, J. Beckley, G. Plunkett and D. Verma, and assigned to a common assignee, the entire subject matter of which is incorporated herein by reference.

BACKGROUND OF THE INVENTION

1. Field of the Invention

The present invention generally relates to tools used for engineering environments and, more particularly, to a Collaborative Engineering Environment (CEE) which provides a multi-disciplinary engineering team with immediate access to all relevant product information.

2. Background Description

Traditional engineering approaches are based on a document-centric model of information exchange. These approaches introduce communication inefficiencies in multi-disciplinary concurrent engineering teams that are in a rapidly evolving design environment. Once a design has stabilized (into a "baseline"), inefficiencies arise from searching for the required information. Furthermore, at all times, engineers must translate information from design documentation into and out of their domain specific toolsets, introducing data translations latencies and errors and often times making incorrect or improper decisions based on out of date information. After a product has been produced, substantial information regarding design decisions is lost, introducing inefficiencies in supporting the product.

Many current Commercial-off-the-Shelf (COTS) Product Data Management (PDM) systems offer basic product structure management, life cycle management, document management, configuration management, workflow management and administrative capabilities required by an engineering organization. These capabilities are all supported through various underlying information models describing the product under consideration. Engineering tool interfaces are limited to computer aided design/computer aided manufacturing (CAD/CAM) tools or document file-centric interfaces such as text editors, word processors, spreadsheet tools, presentation tools, and selected external databases. Interfaces with other systems are based on interchange standards that focus on mechanical and structural aspects of the system.

Many unique requirements associated with complex electronic systems are not supported by current COTS PDM products. Associative representations of the physical, functional, and operational information describing the complex electronic system are not supported. Related scheduling, costing and infrastructure descriptions cannot be associated, as well. Interfaces with engineering tools that create or use this information do not exist. Full functional web-centric PDM system products are now emerging to support widespread user access, easily managed deployment, and large scale integration of the PDM environment with other information management systems such as PDM systems, Enterprise Resource Planning (ERP) systems, electronic commerce, and COTS PDM toolsets.

Enterprise systems can include not only the systems engineering and design organizations, but also the customer and industry program management, procurement, manufacturing, maintenance, user, training, and operations organization.

SUMMARY OF THE INVENTION

It is therefore an object of the invention to utilize the advances in Product Data Management (PDM) technologies to build a user-friendly Collaborative Engineering Environment (CEE) to reflect the complex electronic systems integration domain and to allow for lifetime support of the products developed, by utilizing the CEE.

It is another object of this invention to provide an engineering information management system that provides interactive access to all aspects of the managed design baseline(s), including information capture, creation, update, deletion, management and automated interfaces to multi-disciplinary toolsets. Immediate access to the latest product information, as well as access to all associated information, tools, models and simulations enables greater visibility and more rapid turnaround of design alternatives and options assessments. At the same time, decisions can be obtained with a higher level of confidence when the evaluated trade-offs include a greater scope of pertinent design parameters than previously possible. The lack of these capabilities is a significant shortfall of the systems in the prior art.

It is another object of the invention to provide a tightly coupled process automation for coupling information with engineering processes and ensuring adherence to repeatable and traceable engineering processes.

It is another object of the invention to provide increased multi-disciplinary information integrity, reduced cycle time, design-centric engineering, and interactive enabling of concurrent engineering. Low cost engineering assessment and design relevance is also provided through reduced information manipulation. Multi-disciplinary engineering tools such as custom total ownership cost estimation, commercial cost estimation, performance analysis, stochastic modeling (e.g., SPAR™ predictive modeling tool available from Clockwork Group of Herzliya, Israel or Tiger available from the U.S. Government), requirements traceability, COTS Assessment and Selection Tools (CAST™, available from Lockheed Martin Naval Electronics and Surveillance Systems, Manassas, Va.), are enabled through bidirectional automated information mappings between the tool and the information model managed in the underlying CEE (Collaborative Engineering Environment). This allows for information capture from the native engineering toolset and tightly couples the engineering tools to a rapidly evolving design set, enabling concurrent engineering through a controlled evolution of design. (SPAR™ is a trademark of Clockwork Group of Herzliya, Israel. CAST™ is a trademark of Lockheed Martin Corporation.)

According to the preferred embodiment of the invention, a computer implemented web-centric collaborative engineering environment (CEE) provides an inter-enterprise collaborative mechanism for organizations developing and maintaining complex system products. The CEE provides a federated architecture linking multiple systems and applications together to enable collaboration among enterprise members. At the base of the CEE is an object oriented database managing an associative object model (product model) for providing a persistent understanding of product and program information, assets and tools available in the enterprise.

The CEE is built on a framework for collaboration to provide access control, security, search mechanisms, concurrency control, versioning, information structuring, information mapping and exchange. The collaboration is accomplished by linking members of the enterprise with information in the database, where the information available to each member is information necessary for that member to complete role and team based tasks. The means for linking comprises a plurality of tools where each tool communicates information with the object oriented database. Each member communicates with the enterprise for collaboration using a standard web interface where the web interface is instantiated for specific programs, roles and teams. Members complete their domain related necessary tasks using tools specific to their domain, e.g., domain model. The domain-based tools are integrated with the object oriented data base by a combination of data conversion tools, input/output forms, report generators, automated workflows and associative data models.

Each domain model is developed from the life cycle perspective. Each domain model overlays system views (functional, physical, operational) and system schedules (development, production, technology refreshment/insertion, support, platform availability) with the infrastructure of the program (development, production, support). Within the domain architecture are defined relationships and standard parameters that often can be dynamically modified for different programs, projects, or teams.

The domain models are integrated with the collaboration layer so that interested parties have immediate access to the current system baseline information in authorized domain areas. Access to all information, tools, models and simulations associated with the system development on a program are also available immediately to interested parties, thus guarding the integrity of the system by eliminating information defects.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The collaborative engineering environment (CEE) of the present invention provides an inter-enterprise collaborative mechanism for system integrators, subcontractors, teammates, suppliers, partners, users and customers. It provides a federated architecture linking multiple systems and applications together to enable collaboration to conceive, develop, produce, sustain and retire complex system products. Critical information is made readily available to every member of the extended enterprise.

Figure 1:
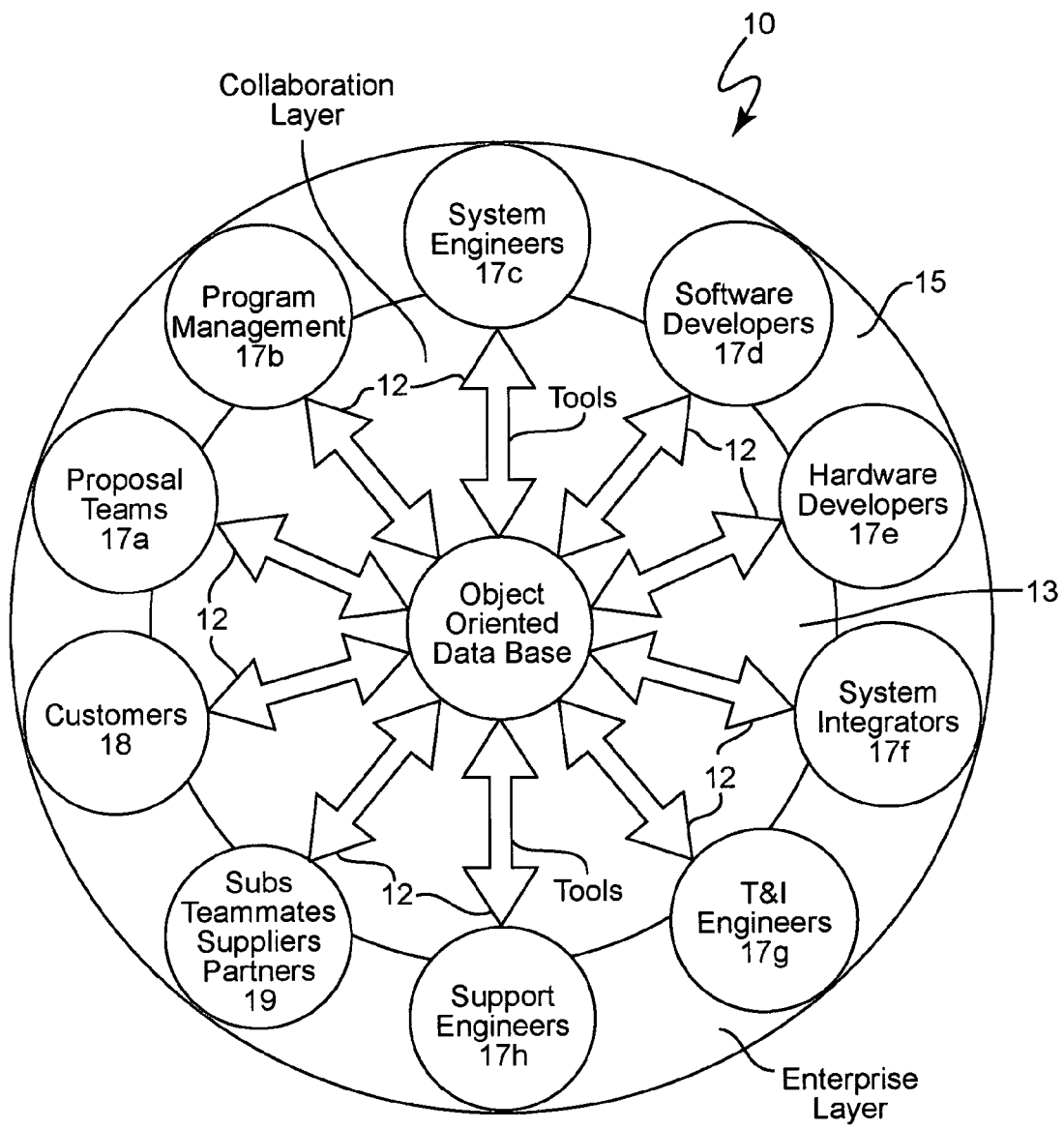
FIG. 1 is high level conceptual drawing of a collaborative engineering environment (CEE) according to the invention.

Referring now to the drawings, and more particularly to FIG. 1, there is shown a conceptual overview of the preferred embodiment of a CEE. An associative object model managed within an object oriented database 11 provides a persistent understanding of the product information assets. A collaboration layer 13 provides access control, security, search, ownership, concurrency control, versioning, information structuring, information mapping and exchange, and other capabilities to link members of the Enterprise 15 with the information they need, using the appropriate tools 12 for their domain area. Workflow automation is also provided within the collaboration layer 13 to provide the linkage of team members 17, 18 and 19, information and business process. Enterprise members provide expertise in a variety of domain areas. For instance, proposal teams 17a, program management 17b, system engineers 17c, software developers 17d, hardware developers 17e, system integrators 17f, testing and integration engineers 17g, support engineers 17h, members external to a development organization (e.g., subcontractors, teammates, suppliers and partners) 19, and customers 18 all play a part in the enterprise. In the preferred embodiment, members interact with the CEE through familiar web interfaces and engineering tools with the presentation structured for the appropriate domain.

Engineering has traditionally been a document-centric activity. Drawings, bills of material, specifications, software and system designs, test plans, training manuals, user manuals, etc. convey the information between the various communities and domains. By placing product information at the center of the system life cycle, tightly coupled multi-disciplinary and enterprise member interactions are facilitated. This associative information model of the product is referred to as the "Product Model."

An associative information model (Product Model) is defined for the enterprise. This product model is the basis for a database schema to include all data defined for use in implemented domains and tools in the CEE. It may include additional data, as desired. System physical descriptions, system functional descriptions, system operational descriptions, system environment descriptions and system schedules are defined in the Product Model. Thus, the Product Model contains a complete specification of the system. While the preferred embodiment is to implement all domains in an enterprise as members of the CEE, domains may be incrementally added to the CEE as time and funds permit. A CEE comprising only a subset of all domains in the enterprise is an advantage over limited systems of the prior art which provided minimal cross-domain collaboration. As a minimum, the Product Model need only contain the essential "independent" data for implemented domains. "Dependent" data may be generated on an as-needed basis using the independent data contained in the database.

Figure 2:
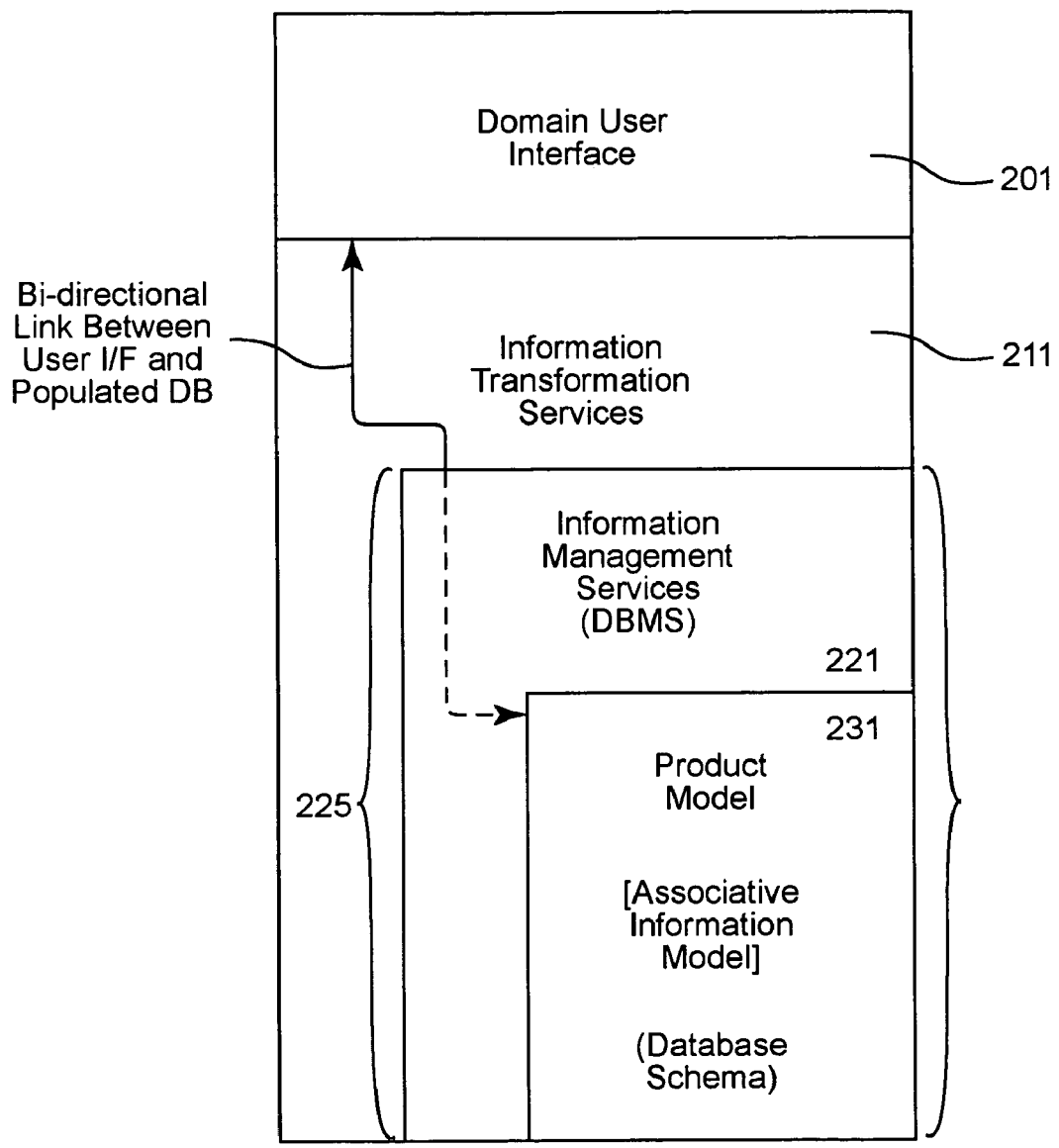
FIG. 2 shows a high level conceptual diagram of the interaction between a domain area and the Product Model.

Referring now to FIG. 2, there is shown a conceptual diagram of the interaction between a domain area and the Product Model. A member of the enterprise interacts with the CEE via a domain user interface 201. The preferred embodiment of this interface, as described further below, is via standard web browsers. Enterprise members require various tools to complete their domain tasks. The set of tools required is dependent on the domain, i.e., systems engineering, logistics support, program management, etc. Access to automated tools is made available through the domain user interface. For instance, a software manager may choose to view or update the software requirements traceability matrix for a program using DOORS® available from Quality Systems and Software, Inc., Mt. Arlington, N.J. The data required to execute the desired task is pre-defined. The Information Transformation Services layer 211 acts as a bi-directional link between the user interface and the populated CEE database. Previously stored data in the database, according to the associative information model (product model) 231, is retrieved by the Information Management Services layer (nominally a database management system) and then transformed by the Information Transformation Services into a format that can be used by the selected tool, i.e., in this case DOORS®. A similar process in utilized for updating or storing new data generated by a domain user. (DOORS® is a registered trademark of Quality Systems and Software, Inc., Mt. Arlington, N.J.)

Figure 3:
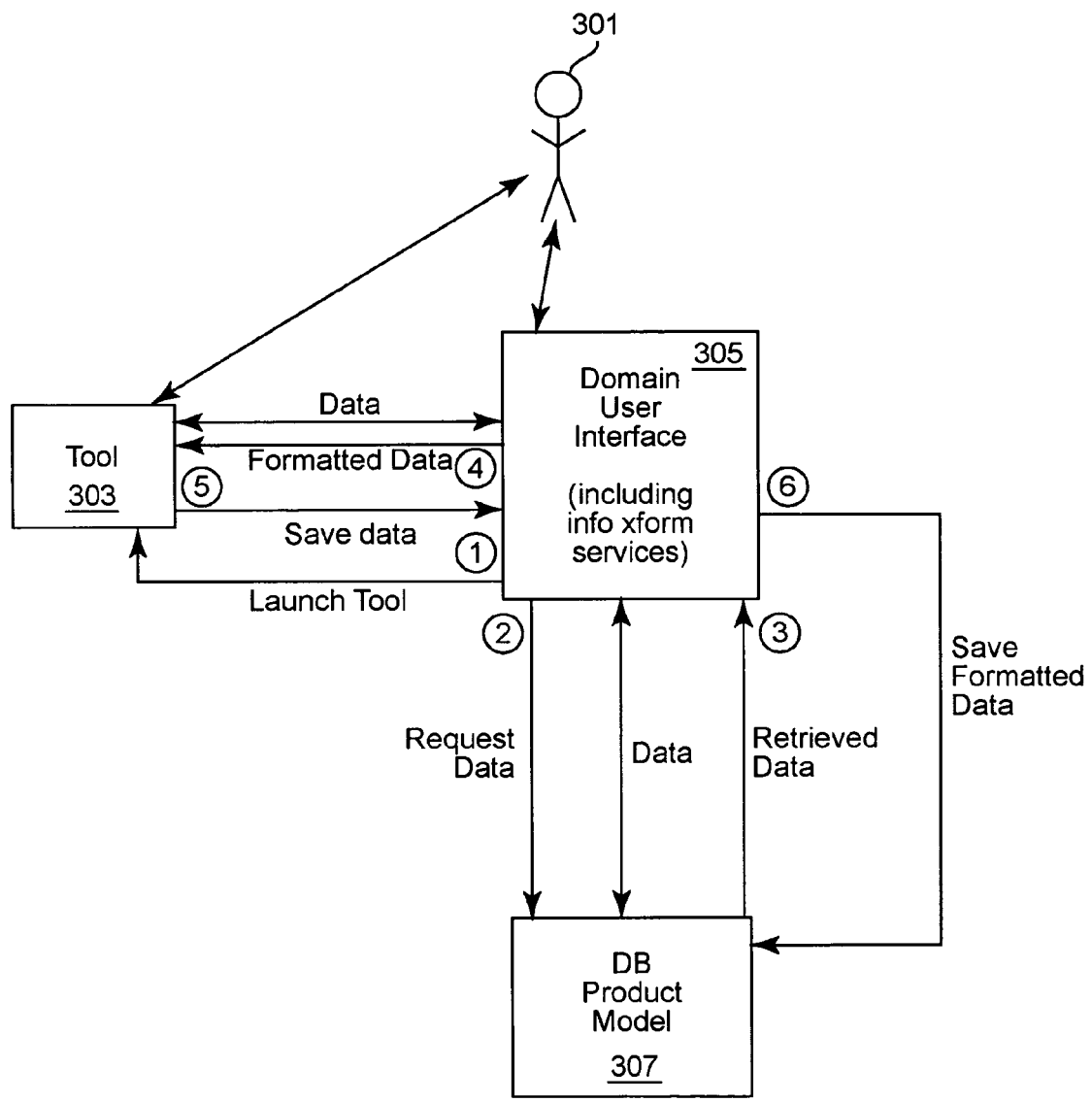
FIG. 3 shows a simplified data flow through the CEE.

Referring now to FIG. 3, there is shown a simplified data flow through the CEE. A user 301 selects a tool 303, preferably through the domain user interface 305 which then launches the tool. The Transformation services, shown here as part of the domain user interface 305, request the data from the database 307. The retrieved data is then transformed and passed back to the tool 303. If the user 301 desires to save updated information, the raw data output by the tool 303 is sent to the information transformation service, herein shown as part of the domain user interface 305, which formats it for storage in the database 307. The formatted data is then saved in the database and immediately available to other users in the domain. The Information Management Services layer (not shown) handles access control, concurrency, versioning, etc. in order to provide necessary configuration management of the enterprise data.

Figure 4:
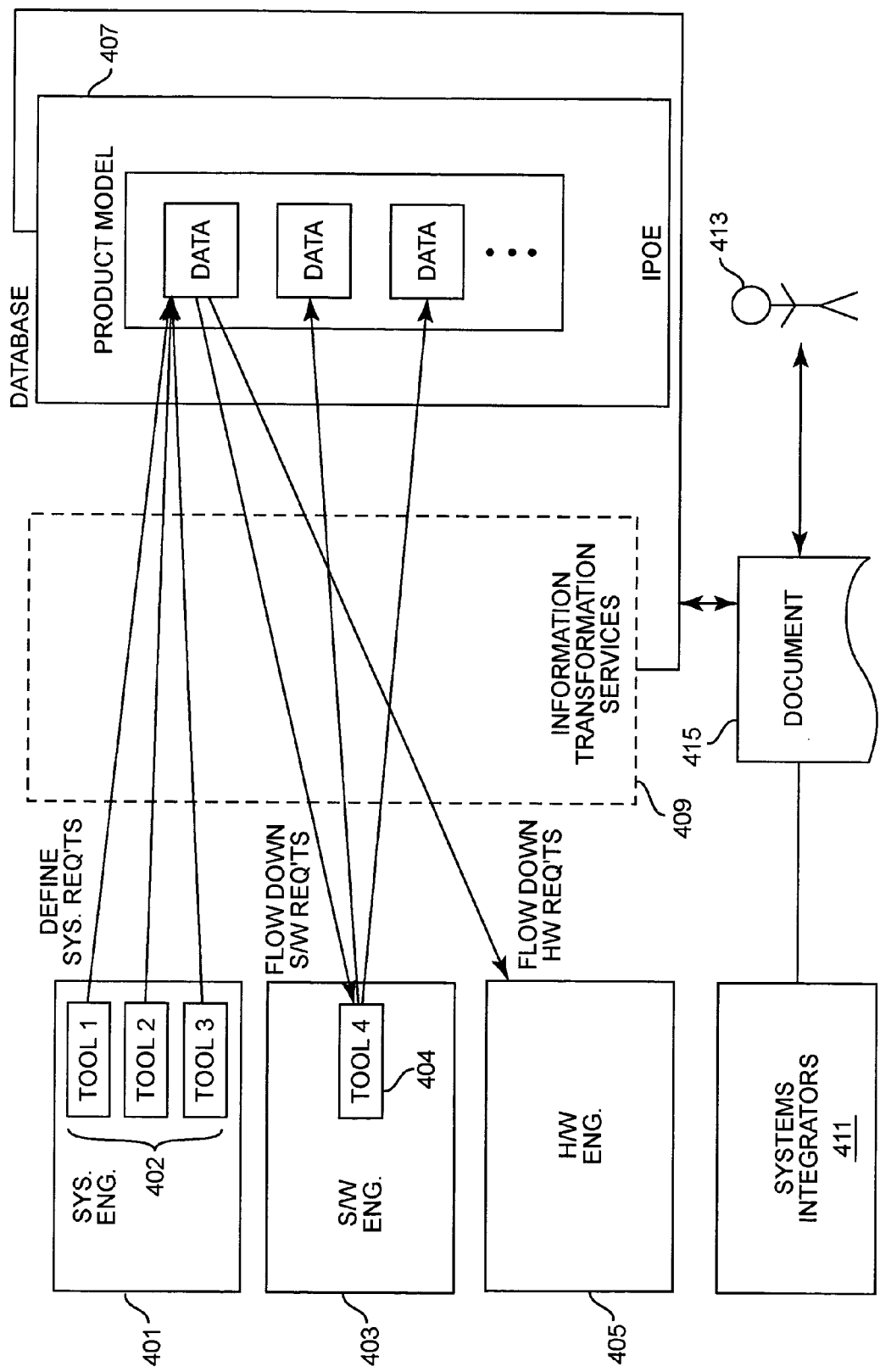
FIG. 4 shows a view of the interaction between domain areas and the database, or integrated product data environment (IPDE), as defined by the Product Model, within the CEE.

FIG. 4 shows another conceptual view of the interaction between domain areas and the database, or integrated product data environment (IPDE) within the CEE. Members of the System Engineering domain 401 utilize a variety of tools 402, for instance to define system requirements. Data related to the system requirements are saved in the database 407, according to the Product Model, via the Information Transformation Services 409. The Information Transformation Services 409 does all of the filtering and transformation of data and requests for read/write into the database. Software Engineering 403 utilizes a tool 404 which uses the data generated by the Systems Engineering domain 401 in order to flow down the software requirements. The required data is retrieved from the database 407, as needed to populate the tool 404. The software requirements generated by the tool 404 are then saved in the database 407 for use by other members of the enterprise. Hardware Engineering 405 would also retrieve the data stored by System Engineering in order to flow down the hardware requirements. The data defining the system requirements is stored in the database 407 by System Engineering. It is not necessary for Software Engineering 403 and Hardware Engineering 405 to utilize the same tool, or the exact set of data with respect to defining requirements. The data sets are defined by the Product Model for the enterprise domains implemented in the CEE. Suppose that the System Integrators 411 are not integrated into the CEE. A system integrator user 413 uses traditional methods of data transfer, such as paper documents 415, to communicate and collaborate with other members of the enterprise.

The inventors developed an early prototype embodiment of the CEE to serve as the proof of concept for the entire CEE. A prototype framework for the CEE was developed that could accommodate a subset of the enterprise domain areas and was integrated with a database and PDM to provide a pilot system enabling a systematic execution of cost-as-independent-variable (CAIV) for COTS-intensive complex electronic systems. This prototype is discussed in detail further below. The present invention builds on lessons learned during the prototype development and provides trade-offs in design and function based on the pilot CAIV system.

In order to exploit a life cycle perspective during design, the CAIV model overlays system views (functional, physical, operational) and system schedules (development, production, technology refreshment, support, and platform availability) with the infrastructure (development, production, and support). This information is linked with cost estimating relationships to populate a cost breakdown structure. The CAIV model architecture is also driven by the need to conduct qualitative assessments in the absence of precise cost data. This is particularly true when evaluating technology refreshment and migration alternatives over system life. Such considerations drove development of the high-level architecture for the CAIV model and tool.

Embedded within the CAIV model architecture are cost estimating relationships that populate the cost breakdown structure. With increasing emphasis on COTS, a number of variables traditionally assumed constant become dynamic, for instance, production cost, spare parts, inventories, reliability and performance. Future improvement in the model may result from revisiting a number of cost estimating relationships along with their corresponding basis of estimates. While some of these estimating relationships have already been developed, research and development continues in this regard. It would be apparent to one skilled in the art that improvements in these areas could be mapped to the design of the preferred CEE to create a more robust environment. A specific example of a cost estimating relationship is the estimation of current and future COTS hardware production costs. This estimation algorithm is based on the expected pace of technology evolution within specific technology segments. Such COTS hardware cost projections guide technology migration evaluation from a life cycle cost perspective, as a part of the overall technology refreshment strategy.

Another key factor in evaluating technology migration alternatives is analysis of the investment necessary in COTS spares and repair parts. This analysis must consider evolution of the system configuration and the associated reliability block diagram, resulting from technology refreshment alternatives. Furthermore, issues pertaining to cross configuration compatibility of logistics resources must be evaluated.

A CEE implementation of the CAIV model allowed interested parties immediate access to current system baseline information, as well as access to all information, tools, models and simulations associated with the system development. The prototype CEE leveraged a COTS PDM application, several COTS engineering tools, a custom integration framework, and a set of custom applications. The pilot objectives were to build a second generation PDM and information leveraging technology knowledge base, prove the efficacy of collaborative engineering environments, and to initiate development of capabilities enabling the systematic application of CAIV methodology for COTS-intensive systems. Cost considerations and integration of reliability, maintainability, availability, supportability, producability, etc., early and consistently through the life cycle of the system are more easily managed and more completely in scope, enabling not only cost competitive system development but contract management and support of the fielded system. Product integrity is enhanced through the systematic elimination of information defects during the design process.

Referring to FIG. 2, in the CAIV prototype, the CEE is built on a layered software architecture. A COTS Database Management System (DBMS) provides standard Information Management Services 221. A COTS product data management system (PDM) system 225 augments the DBMS with engineering specific information management capabilities. These capabilities include product data management, document management, configuration management, and workflow management. A custom developed software framework provides an extensible infrastructure for interfacing engineering applications into the PDM environment and provides a standard Application Programming Interface (API) 201 and 211 for engineering application interfaces not traditionally supported by the PDM vendor. In addition, it provides an opportunity for managing a single product model information schema 231 for both the information management system (PDM) 225 and its interfacing applications 201 and 211.

Considerable attention must be placed on the specification of the product model. Domain experts and high level managers in the domains selected for integration in the CEE must participate in the analysis process to specify the requirements for the product model. For the preferred embodiment, this was done using the Catalysis Object-Oriented (O) methodology as described in D. D'Souza and A. Wills, "Objects, Components and Frameworks with UML: The Catalysis Approach" (Addison-Wesley, Massachusetts, 1998), herein incorporated by reference, to specify requirements for the system. Among other things, Catalysis extends the Object Modeling Technique (OMT) (see J. Rumbaugh, et al., "Object-Oriented Modeling and Design" (Prentice Hall, Englewood Cliffs, N.J., 1991), herein incorporated by reference) with a rigorous specification of the behaviors of the system being modeled. The system requirements must be captured and documented. For the prototype the Rational Rose toolset, available from Rational Corporation, was used to capture and document the requirements using both the Unified Modeling Language (UML) and Object Constraint Language (OCL). These captured requirements were mapped into the PDM database schema and utilized to build the software product model framework and custom applications.

The Computervision Optegra™ PDM tool provided the pilot system PDM capabilities. Optegra™ is built on top of the Oracle® 7 Relational Database Management System (RDBMS). Product model (or system design) components were built within Optegra™ using the Computervision Locator client. While a product model could also be specified using Locator, a streamlined technique using Microsoft® Excel was implemented to specify the physical structure, components, and associated attributes of the system design and to export a text file which could then be imported into Optegra™. This substantially reduced the time and effort to build a product model within the PDM system. (Optegra™ is a trademark of Computervision Corporation of Bedford, Mass. Microsoft® is a registered trademark of Microsoft Corporation. Oracle® is registered trademark of Oracle Corporation.)

The requirements for a comprehensive life-cycle cost analysis capability incorporating cost models consistent with COTS technology insertion and refreshment strategies necessitated the development of custom CAIV capabilities. A first generation capability, utilizing Microsoft® Excel spreadsheets, lacks scaleability and flexibility with its single spreadsheet architecture resulting in a labor intensive process focusing on a small team of cost engineers to coordinate cost impact assessments of design tradeoffs with the engineering organization. The development of a second generation CAIV application based on tight integration with the baseline system design, technical product and design information, and costing models enables the widespread and systematic application of CAIV processes throughout the system life cycle. The custom CAIV applications interface with the PDM through the custom framework, e.g., Domain User Interface 201 and Information Transformation Services 211.

Four capabilities, or use cases, were developed in the pilot project for the CAIV model implementation in a CEE, each reproducing or extending the first generation application's capability. Each use case is specific to the CAIV domain. It would be apparent to one skilled in the art that different use cases would be implemented for each domain to be integrated into the CEE. Also, different organizations or enterprises might wish to implement domains incrementally based on their priority in the enterprise's product model for development of a complex system.

For instance, each use case provides an atomic capability which can be utilized in the context of a higher level use case to assess increasingly complex life cycle costs. For example, a life cycle cost use case could utilize the hardware procurement cost by configuration for a set of evolving representations of the same system to assess the procurement cost of supporting the system over a specified time period. The pilot application functionality is executed from the command line with output into text files in a standard report format. The output files can then be utilized by any reporting software application.

The Microsoft® Access database product was tailored to include a user interface for migrating CAIV application output files via ftp (file transfer protocol) from the PDM server to the desktop domain, import the files into the Microsoft® Access database, and to produce the corresponding report in a structured format. Report formats were modeled after standard cost status reports generated on ongoing programs using the first generation CAIV capability.

Innovative provisioning concepts that are consistent with the technology refresh/insertion strategy offer significant opportunities for life cycle cost reduction. The COTS spares optimization and allocation methodology combines stochastic modeling of spares demand rates with a multi-attribute decision making model for COTS assessment and selection. Within this process, Clockwork Group's SPAR™ modeling tool is utilized to predict and analyze the time dependant allocation and provisioning of spare/repair parts. Integration of the SPAR™ modeling tool integrates supportability engineering and logistics planning with the program information base and enables the insertion of consistent provisioning information into the managed system description context.

SPAR™ modeling tool is a COTS modeling tool for predicting and analyzing the life-cycle behavior of systems. SPAR™ modeling tool uses information about the components making up the system (reliability and cost), the intended use of the system (Including variations in the production level), and its support infrastructure (frequency of maintenance, availability of resources) to predict its behavior. Monte Carlo probabilistic simulation techniques are utilized to model the behavior of complex systems, handling such phenomena as uncertain and incomplete data, component aging and maintenance, spare parts, variable demands on the system, and component interactions. Outputs include an optimized time dependent allocation of spare parts consistent with system operational concepts, functional and performance allocations, and physical design. These are utilized to determine the cost of spares and repairs for the system under consideration.

An interface for the SPAR™ modeling tool was developed (Information Transformation Services layer) to build required input files from the product model. In its prototype implementation, the input file is built from the product model and an independent "master file." The corresponding Reliability Block Diagram (RBD) must be manually generated within the SPAR™ tool environment. It would be apparent to one skilled in the art that an automated interface could be used that would produce an interface such that all required SPAR™ tool inputs are generated on demand from the product model. The prototype requires manual operations for the feedback into the product model of the generated spare/repair information, but it would be apparent to one skilled in the art how to automate this process, as well.

The PDM tool provided a partial object-oriented API on top of an Oracle® 7 database, necessitating the development of a "persistence infrastructure" software component framework to simulate an object-oriented database interface.

The PDM tool did not directly support a web interface. The pilot system avoided dealing with client/server architectural issues by running CAIV applications directly on the server and manually transferring results to the client workstation environment.

The PDM tool provided a limited and very generic graphical user interface for manipulating product model parts and their relationships. While sufficient for pilot usage, this type of user interface might not be adequate for widespread use.

PREFERRED EMBODIMENT

Experience from the pilot was folded into an improved PDM tool requirements specification, which resulted in the choice of Parametric Technology Corporation's Windchill™ tool to provide foundational PDM capabilities targeting production deployment. The Windchill™ tool is built on an Oracle® 8 database, and provides an out-of-the-box persistence infrastructure that obviates the need to develop one's own. It incorporates the Rational Rose modeling tool, and augments the Rational Rose product's native code generation capability to generate a significant amount of Windchill™ tool specific Java™ software as well as the corresponding database schema for the product model. The architecture used by the Windchill™ tool is web-centric. This facilitates sharing of information among distributed sites (such as customers and contractors) and requires no special client software installation beyond a web browser. The Windchill™ tool is also built to be extended. It provides an extensive Java™ class library as a foundation for custom development. It already includes, for example, a product model "part" class with basic functions and a graphical user interface. While extending the "part" class to support attributes needed by applications such as CAIV still requires custom development, the necessary effort and how the part fits into the Windchill™ tool's framework is well defined. (Windchill™ is a trademark of Parametric Technology Corporation. Java™ is a trademark of Sun Microsystems, Inc.)

The preferred embodiment of the CEE is characterized by attributes that provide further definition of the concept, as well as the high level requirements.

Referring again to FIG. 1, the CEE 10 is an enterprise information management system used to manage information assets. The enterprise includes a target organization, for instance System Engineering 17*c*, other related organizations within the enterprise 17*a*, 17*b*, 17*d–h*, customers 18, users and maintainers (not shown), and teammates, subcontractors, and suppliers 19. Virtual enterprises are also defined in the program dimension. In addition to exploiting consistency and economies of scale at a company level, the CEE integrates with other enterprise systems. In one dimension is the "corporate" enterprise which captures the superset of Information Management Systems, other organizations, information assets, tools, personnel, etc. supporting the business. In the second dimension is a subset of the corporate enterprise comprising a "program" or project. Tactical capability requirements are extended into strategic capabilities applicable across the enterprise. This provides significant tension between tactical needs and those of the larger business but is highly beneficial.

Figure 5:
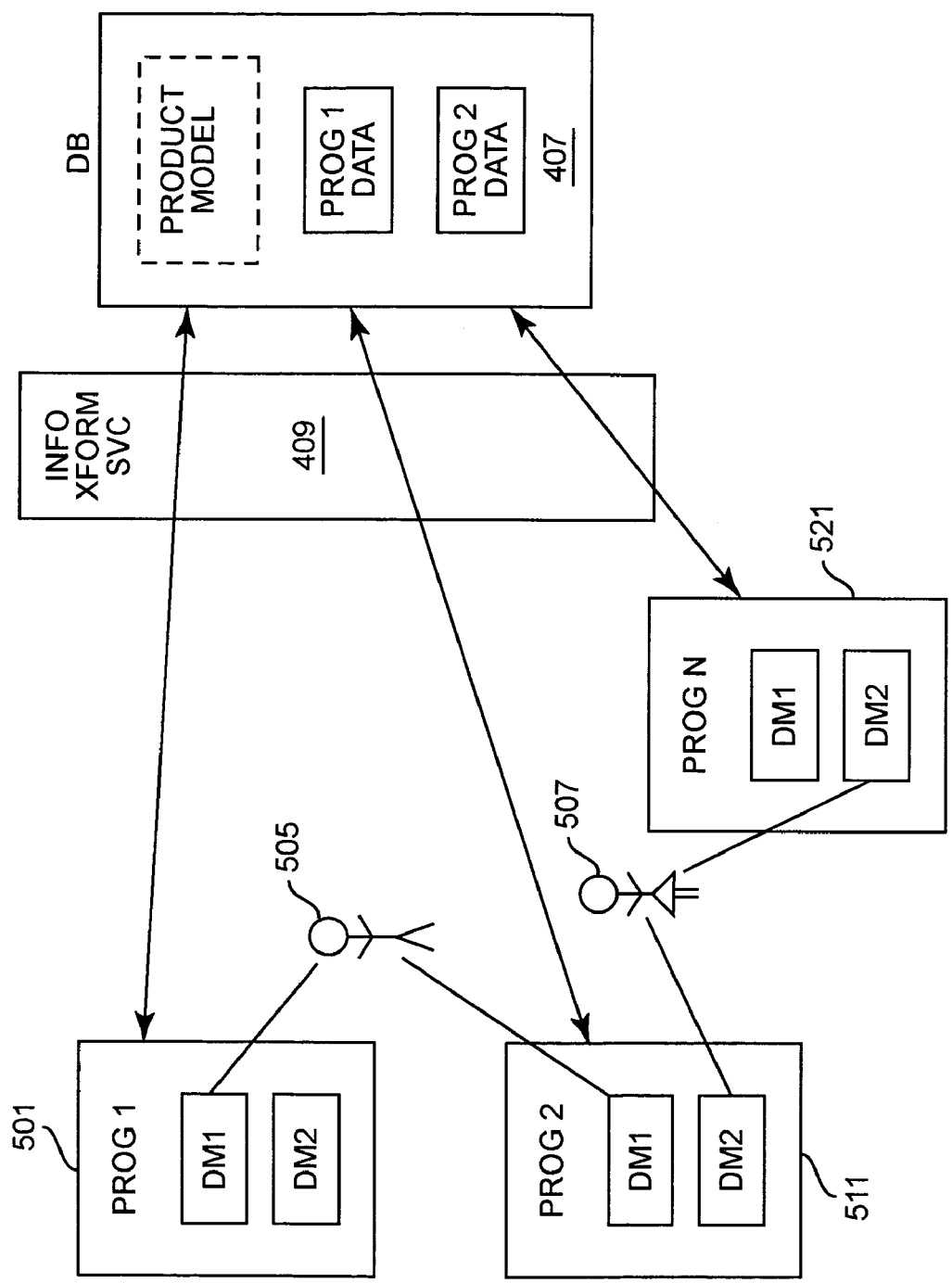
FIG. 5 shows a view of a CEE comprising data for more than one program.

The CEE architecture enables the rapid creation of multiple virtual enterprises within a program or strategic partnership context. Referring to FIG. 5, there is shown a federated architecture of a CEE comprised of multiple programs. Through this federated architecture, information, team members, system, applications and processes throughout the virtual enterprise are electronically integrated. Product and process knowledge is shared regardless of its native format. A user 505 contributes to both Program 1 (501) and Program 2 (511) in a specific domain (DM1). Another user 507 contributes to both Program 2 (511) and Program n (521) in a specific domain (DM2). The programs are within the same enterprise. Therefore, efficiencies are gained by providing a generic domain user interface and a common database for the same user across multiple programs. The Product Model, as implemented in the database schema, segregates the data by program. A property is added in the Product Model that captures the concept of programs and uniquely identifies each datum with its corresponding program or programs. This feature provides additional reuse capabilities.

The CEE provides interactive access to product information assets for all members of the virtual enterprise. Engineers have access to the latest information; program managers have insight into the current state of the product and customers; teammates and suppliers can interact with a master representation of the product information.

Referring again to FIG. 1, Engineering tools 12 are interfaced with product information 11 to provide synchronization with an evolving design. Information is both generated within the tools 12 and utilized by them. Multiple tools and interfaces may participate in specifying the problem. Synchronizing performance analysis, requirements traceability, modeling and simulation, trade study, and other engineering tools with a dynamic evolving design offers substantially increased engineering efficiencies and product integrity while reducing risk and cycle times. One object of the invention is to integrate 'best-of-breed' tools and practices into the CEE, thereby leveraging that investment into the organization. The Product Model concept provides an encapsulated design mechanism for information exchange between multiple disparate toolsets.

The CEE is intended to facilitate the systematic reuse, exploitation, and leveraging of the information assets generated for the Systems produced by the organization. This information includes all designs, documentation, rationale, history, and associated knowledge developed or utilized during the product life cycle. Reuse is supported at the program and enterprise levels.

The CEE facilitates Process consistency across the organization and across programs through an encapsulation of the organizational and program specific business policies. Its federated architecture supports the consistent and flexible integration of external organizations. Workflow automation can be instrumented for metrics collection, assessment, and process refinement.

Enterprise reuse enables the leveraging of scarce critical resources across the enterprise. By enabling subject matter experts to systematically propagate their knowledge across the organization, their expertise can be multiplied throughout an organization, or company. This is critical for COTS-intensive complex systems where rapidly evolving technologies, cost pressures, and short product lifetimes are demanding these efficiencies. This concept also acts as an enabler for short cycle time processes such as systems architecting and proposal generation where substantial collaboration is required.

In the preferred embodiment, a Product Catalog is implemented for the enterprise. The Product Catalog is founded on the associative information model principles of the CEE. It enables the exploitation of multi-disciplinary reuse. An Product Model is defined for the enterprise to include elements, or parts, which are candidates for reuse across programs. In a hardware context these elements could be simple parts such as memory chips, or complex parts such as a microprocessor (which includes multiple simple parts). An element can be an intangible or abstract part, as well, for instance, a process description defining a system design methodology or a set of data related to software design. The Product Catalog holds the default definitions for the defined elements and allows access, customization and instantiation of the elements by programs.

The CEE protects information from unauthorized access based on business policies across the program or company. COTS security mechanisms may easily be exploited using the Information Management Services layer, based on enterprise or program requirements.

CEE users consist of both "power" and "casual" users. Both communities are to be enabled through their Domain User Interfaces with the CEE.

In order to exploit the benefits of a CEE, it must be easy to manage and sustain. This includes the software basis of the system, the production environment, and the information that it manages. As the Product Model evolves, existing information must be efficiently migrated in parallel with the advancing capabilities of the CEE.

The CEE provides a framework supporting the evolution of the engineering enterprise as well as the integration of engineering tool advances. Tools, processes, and product content may be driven by external forces such as the customer. The CEE provides the basis for an ongoing evolution and is supported by the established framework.

The CEE provides the flexibility to be tailored to a diverse set of program requirements. Programs could range from small internal research and development (R&D) projects to large complex systems integration programs consisting of many subcontractors and suppliers. Within the organizational policies, the CEE must consistently capture the rules of business while providing the flexibility to be tailored to support the individual requirements of specific programs.

To accomplish these requirements, in the preferred embodiment, Parametric Technology Corporation's Windchill™ product was selected to provide the CEE infrastructure. The Windchill™ product provides a highly customizable web-centric environment for inter-enterprise collaboration, as well as industry leading solutions for document management, structure management, life cycle management, workflow management, product structure management, change management and collaborative product commerce.

While targeting the manufacturing domain, the rapid development environment of the Windchill product enables the quick deployment of comparable applications tailored for complex electronic systems integration domain. In addition, the underlying product infrastructure is exploited to develop advanced applications combining information, process, and engineering toolsets into highly automated activity-oriented engineering applications.

Figure 6:
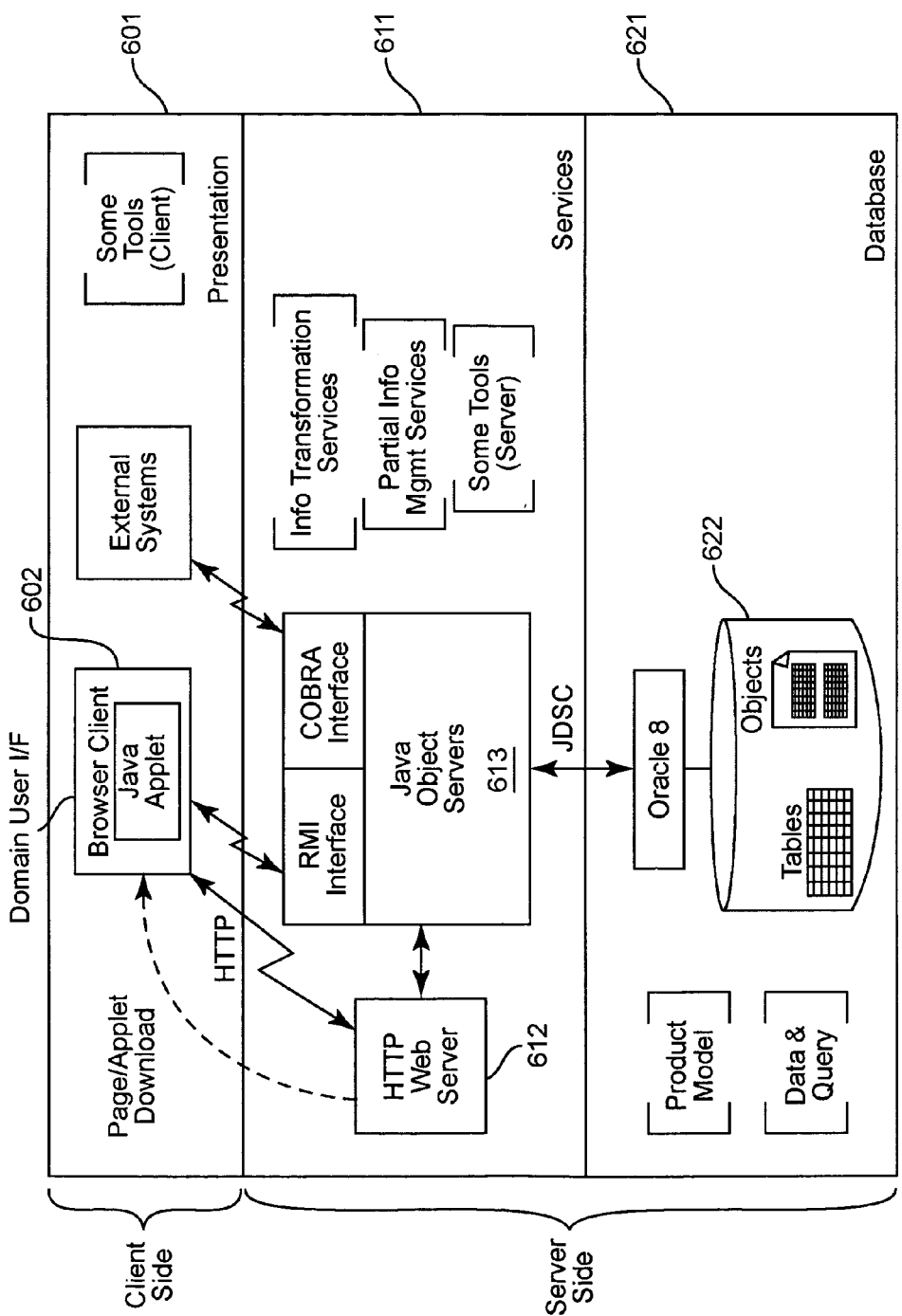
FIG. 6 show a three-tiered architecture for the Windchill™ Product Data Management (PDM) product as used in the preferred embodiment of the present invention.

Referring now to FIG. 6, there is shown the three-tiered web-centric Windchill™ tool architecture. The preferred embodiment is implemented using client/server technology where some functions are distributed to a server and some functions are allocated to clients. Multiple clients are typically used to provide access for members of the enterprise in distributed locations. It would be apparent to one skilled in the art that functions typically implemented on a single server could be distributed to more than one server or that the database could be distributed over more than one server. The Presentation tier 601 uses commercial web browsers 602 to execute a combination of HTML (HyperText Markup Language), JavaScript and Java™ applets to accomplish discrete user tasks. Any user with a Java™ capable browser such as Netscape® Communicator or Microsoft® Internet Explorer, can access the preferred embodiment of the CEE. This Presentation tier is implemented on the client-side and contains the appropriate Domain User Interface(s) and may contain a variety of client-side domain tools. (Netscape® is a registered trademark of Netscape Communications Corporation.)

The Services tier 611 is implemented on the server side and provides the business logic supporting business transaction processing. This functionality is provided by commercial HTTP servers 612 and the Windchill™ tool method servers 613. Custom software provides additional CEE functionality for the Information Transformation Service layer. The Services layer communicates with the database using Information Management Services. Some domain tools may reside here on the server side, rather than the client side, if desired. It would be apparent to one skilled in the art that some functions of the information transformation service may be implemented on the client side, as well. For instance, it may be more expedient to provide some filtering or reformatting of data on the client running a domain tool, and passing pre-filtered data to the server rather than passing raw data and having it reformatted on the server side. The distribution of these functions among servers and clients is dependent on implementation decisions, especially dependent on tools and products selected to implement the DBMS and PDM infrastructures, as well as the set of implemented domain areas.

The Database tier 621 provides the persistence functionality using an Object Relational Database Management System (ORDBMS) 622 to store structured and unstructured data. The preferred embodiment utilizes the Oracle® 8 database because it provides many standard database management system capabilities. The database schema is implemented using the Product Model as a basis. All essential data, as defined by the Product Model is contained in the database 622 in the Database tier. Data queries, retrieval and storage is facilitated by the information management services in the Services tier and the Database tier on the Server side.

Even the best applications become unusable if not presented to the user in a consistent and well thought out environment. Therefore, in the preferred embodiment of the present invention, certain user requirements drive the user framework design, i.e., Domain User Interface, and how those requirements were addressed.

Figure 7:
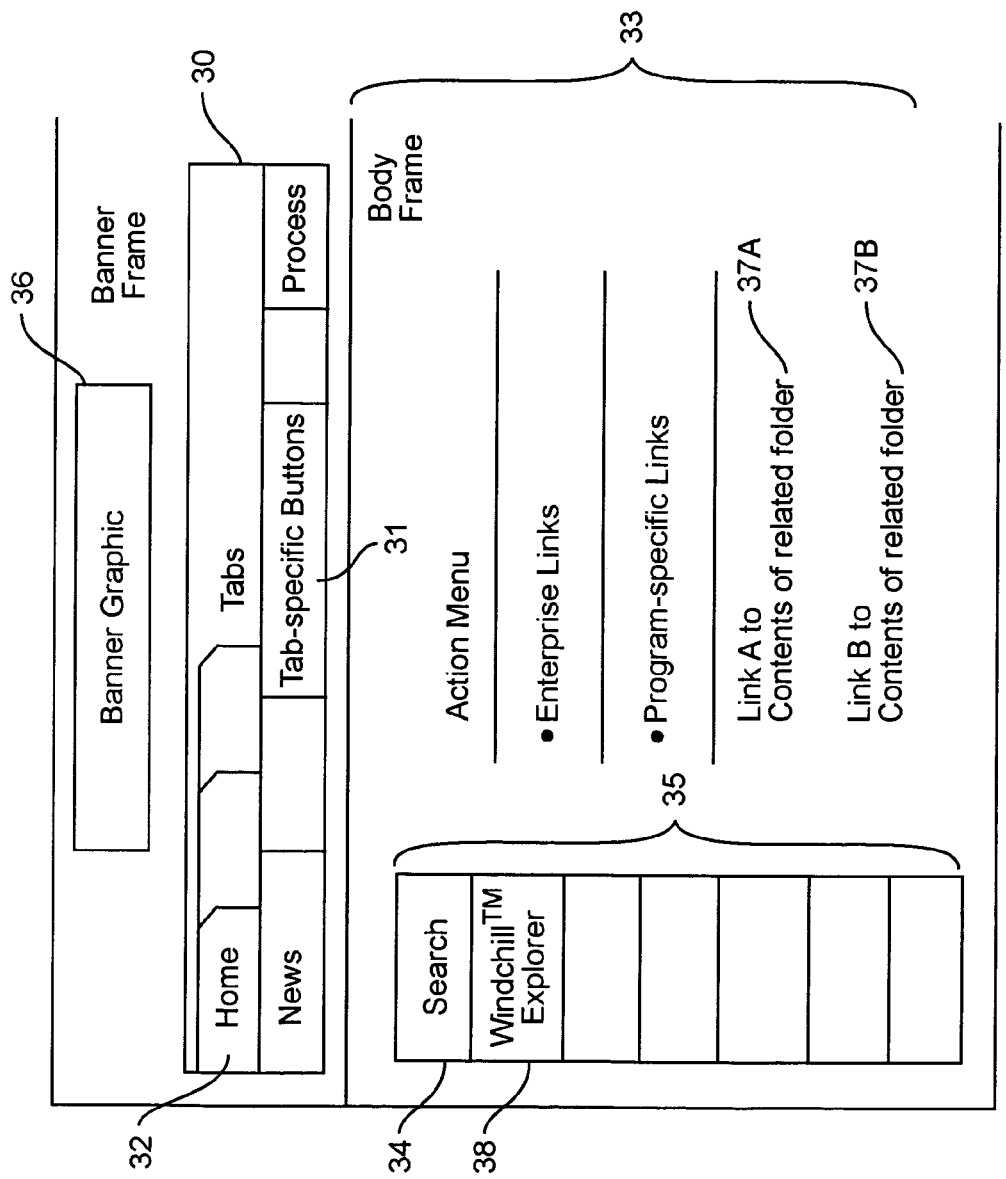
FIG. 7 shows a flexible, standard and customizable home page for a program using the present invention for collaboration.

The enterprise consists of many different programs, or projects, where a program is some defined scope of work, such as a contract or an internal development effort. A typical employee works on many different programs in the course of a career, and may support multiple program at the same time (see FIG. 5). Programs are often supported by geographically dispersed teams of customers, contractors and suppliers. Therefore, the most basic requirement is to provide access to program information across a diverse team of people. Web technology is used to solve this problem. The user interface centers around a program home page, as shown in FIG. 7.

Some members of the enterprise will use the CEE largely to find and review information. Many users will manipulate documents. Some will be "Power users," performing operations such as building complex parts structures. The environment needs to provide the appropriate type of access for all.

Thus, the program home page supports several different ways to access information. Referring now to FIG. 7, the tabs 30 and buttons 31 at the top of the page represent a two-level hierarchical view of the information structure. The tabs 30 represent high level categories. Each tab has a set of buttons 31 or menus providing the next lower level breakdown. The "home" tab 32 contains some of the most basic information categories, such as the "process page" 33, as shown in the body frame.

If a user doesn't know which category to look in, or is looking for information that may span multiple categories, the "search" option 34 is always available at the top of the navigation sidebar 35. The preferred embodiment has two types of searches. It would be apparent to one skilled in the art how to develop additional search schemes, as desired. The first searches for an arbitrary keyword specified by the user. The second searches by type of object (such as document, change request, etc.). Attributes appropriate to the type are presented, and the user fills in desired values for any or all. Search results are presented as a list of hyperlinks to objects. Clicking on a link displays the properties of the object.

The Windchill™ tool also provides an information explorer similar in appearance to the explorer provided with Microsoft® Windows™. From it, users can navigate to any objects in the Windchill™ tool database and manipulate those objects in any way that their access permissions allow. Access to the Windchill™ explorer is provided through a link in the sidebar 38. In general, the explorer presents more information and options than most people need, and it is not intended to be the primary means of using the CEE. It has its role, however, and some of the "power user" or less frequently used operations may only be available via this mechanism.

Finally, users may have different information needs based on the role they play on a program. A software engineer may want a link to a Java™ site, and quality assurance personnel may frequently access an audit database. The present invention declutters a user's view by omitting unnecessary information based on the role of that particular user or membership in a specific team, i.e. role-base and team-based desktops accessible via the "desktops" and "teams" tabs). Clicking on the "desktops" tab presents the user with a menu of supported roles, such as "Software engineer." Selecting a role returns a page with information and links appropriate to that role.

Each program owns its own set of logical folders in the Windchill™ tool environment. In this way the correct set of information can be presented on a program's web pages. For example, the banner graphic 36 includes a program identifier and unique graphic. The links 37 at the bottom of the page are to objects in the program's related folder (process, news, etc.).

In addition to program folders, most objects in the environment are assigned to a program when they are created. This provides an additional benefit, i.e., policies for each program can be defined up front concerning how different types of objects are to be handled on the program, and then this complexity is hidden from the user. For example, program "XYZ" may have two types of change management processes: one for "customer" change requests and one for "internal' change requests. The program may want each type to be filed in a different folder and follow different life cycles (processes) with different sets of participants. An administrator defines and stores that policy information once, only changing it if the policy changes. Then when any user creates a change request object for the "XYZ" program, the user just has to choose between "customer" and "internal" types, and the program's policy decisions are applied to the object automatically.

Because users support multiple programs and/or move from program to program, it is important that the environment look consistent from one program to another. Thus, in the preferred embodiment, the high level folder structure is the same for all programs, and is mirrored by the tab/button structure of the web page. While programs are not all the same, the benefits of making the program entry points look the same outweigh the restrictions. Below that level, programs are free to add subfolders as necessary to meet their needs.

In addition to consistent page organization, consistency in the look of each page is maintained. This was facilitated by use of the Windchill™ tool's dynamic HTML generation mechanisms. When a user requests an HTML page via the browser, the hyperlink points to a template for the actual page that will be returned. The template contains Windchill™ tool "script" calls that get replaced with dynamically generated HTML. For example, the template for the notional "process page", as shown in FIG. 7, contains a script call to "display folder contents." A piece of custom Java™ code determines the appropriate folder for the page and program, and replaces the script call with HTML links to the contents of the folder. That not only means that the "process" page looks consistent from program to program but that it always mirrors the program's current "process" folder content reflecting changes dynamically every time the page is reloaded.

While one of the goals was consistency, programs need to add their own unique links to the pages initially given them. While allowing programs to change the standard pages creates a maintenance problem, the alternative may be too restrictive. Dynamically generated HTML empowers the programs to address such problem. Rather than allowing each program to modify the HTML pages, an area of each page is reserved to display program links. Each program is provided with a text file on the web server containing a list of links associated with each page, and the HTML page is dynamically built based on the content of the file. A program administrator can add a link to the file, and it will be displayed an the designated page the next time the page is accessed. This also means that a program can build another whole tier of supplementary pages, and link them to the initial pages via this mechanism. The result is a clear division of maintenance responsibility between CEE administrators and program administrators.

In the design of the user framework, the ease of setting up a new program was considered. According to the preferred embodiment, the mechanics of the process requires approximately half an hour. The program name is added to a Java™ table which causes it to appear in the program selection menus in all of the system user interfaces. A graphic is provided to identify the program on its web pages. Due to the dynamic HTML generation, no HTML modification is required. A Windchill™ tool utility is used to load the program's standard folder structure.

Appropriate links for the program's web pages and policies for handling of objects belonging to the program are identified. All of this is captured in property files on the web server. As the CEE capabilities expand to provided additional functionality, the scope of this effort continues to grow. It would be apparent to one skilled in the art how to elicit knowledge from the disparate groups and members of the enterprise in order to define and identify policies and customize web pages specific for a program.

In implementing a CEE, one may choose to develop functionality incrementally. Integrating document and change management in a CEE, among other tasks, provide certain advantages and can improve a program's life cycle greatly. Once a subset of domain areas are integrated, others can be integrated in a manner consistent with finding, user resistance or compliance, etc.

At first glance, document management seems to be a fairly simple application; however, it is complicated because documents play many different roles. A document may be an informal record of a meeting or it may be part of a controlled baseline or deliverable to a customer. The last two roles imply very different attributes and processes from the first one. Roles can also apply in combination. A document may be both part of a design baseline and deliverable to a customer. Trying to build document life cycles that take all of the possibilities into account can quickly become complicated.

Therefore, information about the roles played by documents is represented separately from the documents themselves. For example, as part of its baseline role, a document can have a relationship to one or more baseline objects and perhaps some number of change management objects (such as change requests) that represent the change activity that the document has undergone. As a customer deliverable, a document has a relationship to a "contract data requirements object" (or set of objects) that represents its state with respect to its deliverable role. This allows document attributes and life cycles to stay relatively simple. The associated role objects carry attributes and life cycles appropriate to their purpose. For example, the life cycle of the change request (and other related objects) automates the change management process. A document's relationships to its role objects can be used to build checks into the document life cycle such as disallowing the release of a document if its associated change management objects are not in a completed state.

Baseline change management is one of the most widely used processes in an enterprise and is therefore a high priority to implement early. Basically, changes are proposed via change requests which then flow through a series of gates. At each stage, more detail is added, and the request is reviewed for approval to proceed to the next stage. In this way, inappropriate requests can be screened out early before much effort has been expended to analyze them.

The inventors found that Version 4.0 of the Windchill™ tool fit well for the needs of the preferred embodiment. Supported classes include.

"Change issues" and "Change requests" to suggest a change in varying amounts of detail;

"Change investigations" and "analysis activities" to capture information when investigating the nature of the change;

"Change proposals" to propose an approach to the change;

"Change Orders" to order implementation of a change; and

"Change activities" to track change implementation.

Another goal in change management is to automate the process to be flexible enough to meet the needs of both small and large programs requiring varying degrees of formality. One issue is that the number of reviews and review participants at each stage can vary widely. A review board might determine that an additional piece of information is needed, and might postpone any decision until the information is available. That could happen multiple times before the change object moves to the next phase of its life cycle.

This problem is solved by utilizing an "action item" class. An action item allows the originator to forward, and monitor status of, one or more business objects to one or more assignees for action. An originator creates an action item and edits it until it is ready to send. The assignee(s) receive notification of the action item through their personal worklist and e-mail, with hyperlinks to the action item object. In the case of change management, action items can be used to forward a change request to someone to provide more information, and to change board participants for review. Action items represent a common activity pattern found in many business processes.

A concept key to the product-centric information view is the ability to share and reuse product information across programs. The preferred embodiment uses a Product Catalog. The product catalog of the present invention provides an enterprise wide design information library for components and related information. Information contained in the catalog describes projected or currently available mechanical components, complex assemblies, COTS hardware, COTS software, developmental hardware, developed software, or other products assembled to build and operate a complex system. The Product Catalog is managed through a complex applet which provides tools for structuring and managing component information, searching and navigation, and the referencing of component information to construct one or more program specific designs.

The preferred product catalog implementation supports hardware parts and complex assemblies and has been designed for extensibility to other component types. Master part characteristics managed within the catalog include design, cost, reliability, production, and operability characteristics, as well as related modeling information. These characteristics are propagated from the catalog to unique design representations as subscribed to by each design team.

Much of the CAIV implementation, as described above, is devoted to porting the production cost and spares/repairs cost projection models into the Windchill™ environment and providing a robust user interface. A graphical user interface to create hardware parts and enter the complex attributes required to model life cycle cost were developed. Some of the referenced attributes in the product catalog vary based on their usage in each program. For example, the mean time between failures for a part is fixed in the catalog, but how many times that part is estimated to be repaired before being scrapped is a policy that varies by program. The preferred embodiment provides defaults for all part attributes in the catalog and allows a referencing program to override some of them. This capability also enables similar variability in treatment across a program.

In addition to porting the algorithms for the production cost and spares/repairs projection reports, a reporting mechanism is implemented. The results of the report are stored as comma-separated values in a text file inside a document object in the Windchill™ tool. The user can download the report content and import it into Microsoft® Access for report formatting. This is done to allow programs the flexibility to support many different report formats without having to write new software each time. The document object in the Windchill™ tool can be saved or discarded according to the program's needs.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A computer implemented collaborative engineering environment (CEE) for providing an inter-enterprise collaborative mechanism for organizations developing and maintaining complex system products, the CEE providing a federated architecture linking multiple systems and applications together to enable collaboration among enterprise members, comprising:

a database defined by an associative information model for providing a persistent understanding of product and program information, assets and tools available in the enterprise;

an information management service providing controlled access to the database for collaboration and;

an information transformation service receiving, sending and formatting data and acting as a bi-directional link between the database and members of the enterprise, wherein access to the data in the database is managed by the information management service, and wherein the information transformation service provides information structuring, and information mapping and exchange for domain-specific tools; and at least one domain user interface linking members of a domain in the enterprise with information in the database, wherein the information available to each member is information necessary for the member to complete role and team based tasks, and wherein a domain user interface comprises access to at least one domain-specific tool, wherein each tool communicates information with the database via the information transformation service, wherein members have immediate access to data generated by any member of the enterprise, as authorized by the associative information model defining database access and control.

2. A CEE as recited in claim 1, wherein each member communicates with the enterprise for collaboration using a standard web interface, the web interface being customized for programs, roles and teams.

3. A CEE as recited in claim 1, wherein the information management service provides access control, security, search mechanisms, concurrency control, and versioning for data in the database.

4. A CEE as recited in claim 1, wherein the CEE is built with a layered software architecture comprising a database management system (DBMS), a product data management system (PDM) augmenting the DBMS with engineering specific information management capabilities, and the information transformation service utilizes an extensible infrastructure for interfacing engineering or management applications into the PDM environment.

5. A CEE as recited in claim 1, wherein data in the database have a corresponding program identifier, thereby allowing multiple programs within the enterprise to access a same CEE.

6. A CEE as recited in claim 1, wherein the CEE sends/receives information to users in a domain area, the domain area not being implemented in the collaboration environment.

7. A CEE as recited in claim 6, wherein the database associative information model defines data for domain areas unintegrated into the CEE by a domain user interface.

8. A CEE as recited in claim 1, wherein the CEE is implemented using client/server technology, the database and information management services being on a server and domain user interfaces being on at least one client, and tools required by a domain being on one or both of the client and server.

9. A CEE as recited in claim 1, wherein a domain user interface is implemented for one or more domain areas in the group of proposal teams, program management, system engineers, software developers, hardware developers, system integrators, testing and integration engineers, support engineers, subcontractors, teammates, suppliers and partners, users and customers.

10. A CEE as recited in claim 1, wherein the database is object-oriented, facilitating reuse of standard elements among programs and organizations within the enterprise.

11. A CEE as recited in claim 1, wherein the associative information model is developed from a life cycle perspective of implemented domain models, each domain model overlaying system views (functional, physical, operational) and system schedules (development, production, technology refreshment/insertion, support, platform availability) with the program infrastructure (development, production, support), and wherein the domain models define relationships and standard parameters dynamically modifiable for multiple programs, projects, or teams.

12. A method for implementing and using a computer implemented collaborative engineering environment, said method comprising:

specifying and documenting an associative information model for an enterprise to capture physical, functional and environmental system requirements, wherein domain experts provide input into the specifying step for their particular domain;

mapping the captured requirements into a database schema for a product data management system (PDM);

generating an information transformation service between data to be stored in a database managed by the product data management system and tools used by domain specialists in performance of domain tasks, wherein information is stored in the database by various members of the enterprise based on the associative information model for the various member's domain area;

accessing data in the database by members of the enterprise, wherein the data accessed is part of a current baseline and the data retrieved is current for all members accessed the data; and performing domain tasks by a member of the enterprise using domain specific applications, wherein results from the domain specific application are properly formatted by the information transformation service and stored in the database managed by the PDM, the data being immediately accessible to other members of the enterprise.

13. A method as recited in claim 12, wherein the CEE enables immediate information exchange in the access step for one or more domains in the group of proposal teams, program management, system engineers, software developers, hardware developers, system integrators, test and integration engineers, support engineers, teammates, partners, subcontractors, suppliers, users, and customers.

14. A method as recited in claim 13, wherein the access step uses a customizable standard web-based interface to provide members of the enterprise access to collaborative information.

15. A method as recited in claim 14, wherein the standard web-based interface utilizes dynamic Hypertext Markup Language (HTML) generation for program customization.

16. A computer implemented web-centric collaborative engineering environment (CEE) implemented using client/server technology for providing an inter-enterprise collaborative mechanism for organizations developing, integrating or maintaining complex system products, the CEE providing a federated architecture linking multiple systems and applications together to enable collaboration among enterprise members, comprising:

an object oriented database facilitating reuse of standard elements among programs and organizations within the enterprise, the database residing on a server computer and defined by an associative information model, said object oriented database being augmented with engineering specific information management capabilities for providing a persistent understanding of product and program information, assets and tools available in the enterprise, wherein the associative information model defines physical, functional and operational attributes of elements within at least one domain area in the enterprise and relationships among the elements include a corresponding program, role or team;

an information management service residing on a server computer providing controlled access to the database for collaboration using an access control scheme defined by policies of the enterprise, the information management service using an object oriented database management system for access and control of the database and;

an information transformation service utilizing an extensible infrastructure to interface engineering or management applications used in a domain into the CEE environment and acting as a bi-directional link, the information transformation service receiving, sending and formatting data between the database and members of the enterprise, wherein access to the data in the database is managed by the information management service, and wherein the information transformation service provides information structuring, and information mapping and exchange for domain-specific tools; and at least one domain user interface residing on at least one client computer linking members of the enterprise with information in the database, wherein the information available to each member is information necessary for the member to complete role and team based tasks, and wherein a domain user interface allows a member access to at least one domain-specific tool, wherein each tool communicates necessary information with the database via the information transformation service, and wherein an implemented domain user interface is customized for a domain area in the group of proposal teams, program management, system engineers, software developers, hardware developers, system integrators, testing and integration engineers, support engineers, sub-contractors, teammates, suppliers and partners, users and customers, wherein domain members have immediate access to data generated by any member of the enterprise, regardless of domain, as authorized by the associative information model defining database access and control and controlled by the information management service, and each member communicates with the enterprise for collaboration using a standard web interface, the web interface being customized for programs, roles and teams.

17. A CEE as recited in claim 16, wherein data in the database have a corresponding program identifier, thereby allowing multiple programs within the enterprise to access a same CEE.

18. A CEE as recited in claim 16, wherein the CEE sends/receives information to users in a domain area, the domain area not being implemented in the collaboration environment.

19. A CEE as recited in claim 16, wherein the database associative information model defines data for domain areas unintegrated into the CEE by a domain user interface.

20. A CEE as recited in claim 16, wherein the information transformation service performs some tasks on the server and some tasks on at least one client.

21. A CEE as recited in claim 16, wherein the associative information model is developed from a life cycle perspective of implemented domains models, each domain model overlaying system views and system schedules with the program infrastructure for development, production or support, and wherein the domain models define relationships and standard parameters dynamically modifiable for multiple programs, projects, or teams.

* * * * *